INVENTOR.
HERBERT R. UHTENWOLDT

United States Patent Office 3,141,385
Patented July 21, 1964

3,141,385
PRECISION INDEXING MECHANISM FOR
MACHINE TOOLS
Herbert R. Uhtenwoldt, Worcester, Mass., assignor to The
Cincinnati Milling Machine Co., Cincinnati, Ohio, a
corporation of Ohio
Filed Jan. 15, 1963, Ser. No. 251,595
12 Claims. (Cl. 91—189)

This invention relates to an angular indexing mechanism of the type that is particularly useful in rotating a machine tool worktable from station to station during the performance of a series of operations upon workpieces supported thereon.

An object of this invention is to provide a mechanism into which information representing a series of selected angular positions can be preset conveniently and accurately and then subsequently can be used directly to control angular movement of a rotatable member.

Another object of this invention is to provide a dual speed angular positioning mechanism in which the angular position information is preset and mechanically stored and is available to produce coarse and fine position signal information during station to station movement of a rotatable member.

Yet another object of this invention is to provide an information storage and control mechanism in which information having a binary code relationship is utilized to define a fine position increment of indexing movement to be added to a coarse position movement.

A further object of this invention is to provide an angular indexing mechanism that is particularly adapted for use with machine tools having a completely automatic cycle control system.

An additional object of this invention is to provide an automatic indexing mechanism in which the stop stations may be readily changed with ease and in which accuracy of angular settings is inherent without set-up cycles and readjustment.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, the present invention utilizes a coarse position motor connected to an index plate for movement thereof from coarse position to coarse position. The coarse positions are defined by a series of trip dogs spaced at equal angular intervals around a member rotatable with the index plate. Each of these coarse position dogs is retractable to an inoperative position to provide a selectivity of coarse angular positions or stations of the index plate to which it can be moved. The coarse position trip dogs when not retracted operate a trip signal device as the index plate is rotated to the selected coarse positions. When the coarse signal device is operated it produces a signal that is effective to stop the coarse position motor and to connect a fine position motor to the index plate. The connection of the fine position motor to the index plate adjusts the coarse angular position to correspond accurately with the selected division of the circle represented by the coarse dog which stops the coarse motor. In addition the fine position motor may be operated through a selected distance to add an increment of fine movement to adjust the angular position of the index plate beyond the selected coarse station. A set of fine trip dogs is associated with each coarse trip dog and these fine dogs may be extended selectively to operate a set of fine position trip devices to produce a composite fine position signal. The fine trip dogs are set in accordance with a binary code to define any one of several increments of added angular movement to provide final fine positioning. A control circuit responsive to the composite signal operates the fine position motor through a distance corresponding to the defined fine increment and thus shifts the index table away from the selected coarse position an angular distance represented by the binary coded information set in the machine by the extension of selected ones of the fine dogs to their operating positions.

A clear understanding of the construction and operation of the present invention can be obtained from the following detailed description in which reference is made to the attached drawings wherein.

Figures 1, 2:
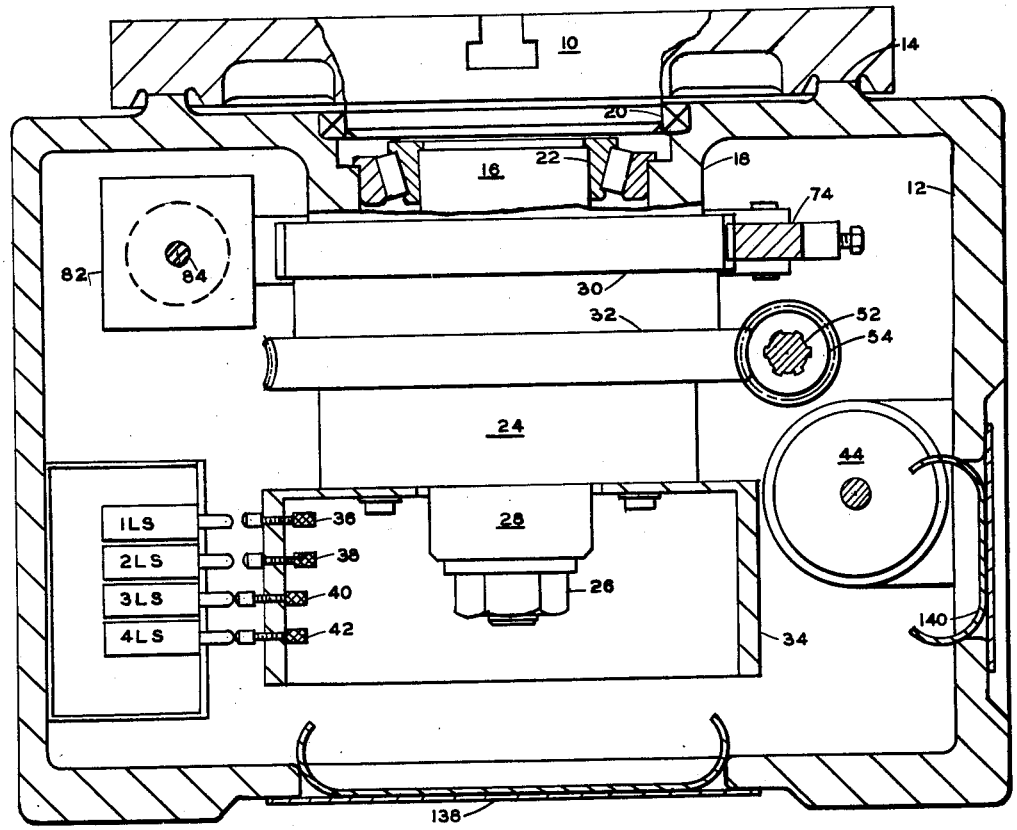
FIG. 1 is a view of a rotary indexing fixture shown partly in section and partly in elevation.
FIG. 2 is a schematic showing of the coarse positioning portion of the indexing mechanism.

In the described embodiment, an index plate 10 is supported on a base 12 for rotation around an annular way 14. The rotational drive to the plate 10 is applied to a spindle 16 to which the plate 10 is fixed. The spindle 16 extends inwardly through a collar 18 which is cast integrally with the base 12. The spindle 16 is supported in the collar 18 by antifriction bearings 20, 22 for rotation therein. A drive member 24 is secured on the lower end of the spindle 16 by a nut 26 which is threadedly engaged on the lower end of the spindle 16 and is turned tightly against a cylindrical projection 28 of the drive member 24 which forces mating tapered surfaces therein (not shown) of the spindle 16 and drive member 24 into intimate contact. The tapered surfaces are keyed together to prevent relative rotation. Thus the drive member 24 is fixed on the spindle 16. The drive member 24 extends outward and then upward around the collar 18. A gear 30 is formed on the member 24 above a worm wheel 32 also formed thereon. A drum 34 is fixed on the lower portion of the member 24 and is rotatable therewith. Spaced at positions separated by equal angular intervals around the drum 34 are sets of stops, each set including stops 36, 38, 40, 42 in a row at each particular angular position (only one set shown for simplitcy). It is apparent from the foregoing that the plate 10, spindle 16, drive member 24 and drum 34 comprise an integral rotating unit.

The rotating unit is driven by two independently operable mechanisms. The coarse driving mechanism, shown in FIGS. 1 and 2, employs a rotary fluid motor 44 driving through gears 46, 48 to rotate a shaft 50 journalled in the base 12. The shaft 50 has a splined portion 52 on which a worm 54 is received for limited axial movement. The worm 54 is urged in one direction against the end of the splined portion 52 by a spring 56. The worm 54 is drivingly engaged with the worm wheel 32. The direction of operation of the motor 44 is such that the worm wheel 32, and the whole rotating unit, is rotated clockwise as viewed in FIG. 2. Therefore the reaction of the worm wheel 32 tends to move the worm 54 on the splined portion 52 to the same end thereof as does the spring 56.

The fluid operating circuit for the coarse position mechanism includes a pump 58 furnishing fluid to a pressure line 62 which is connected to a two position, single solenoid, spring returned valve 64. The valve 64 is also connected to the reservoir 60 via a back pressure relief valve 66 by a fluid line 68. The valve 64 may be shifted by energization of its solenoid 5SOL to connect the pressure line 62 to an operating line 70 while the return line 68 is connected to a second operating line 72. When the motor 44 thus is connected to the pressure differential of lines 62, 68, it is operated to drive the gear train to the rotating unit and rotate the worm wheel 32 in the clockwise direction as viewed in FIG. 2. With the solenoid 5SOL deenergized, the fluid pressure line 62 is connected to the operating line 72 as shown and the line 70 is blocked to prevent operation of the motor and thereby the motor 44 is held in a static condition.

Figure 3:
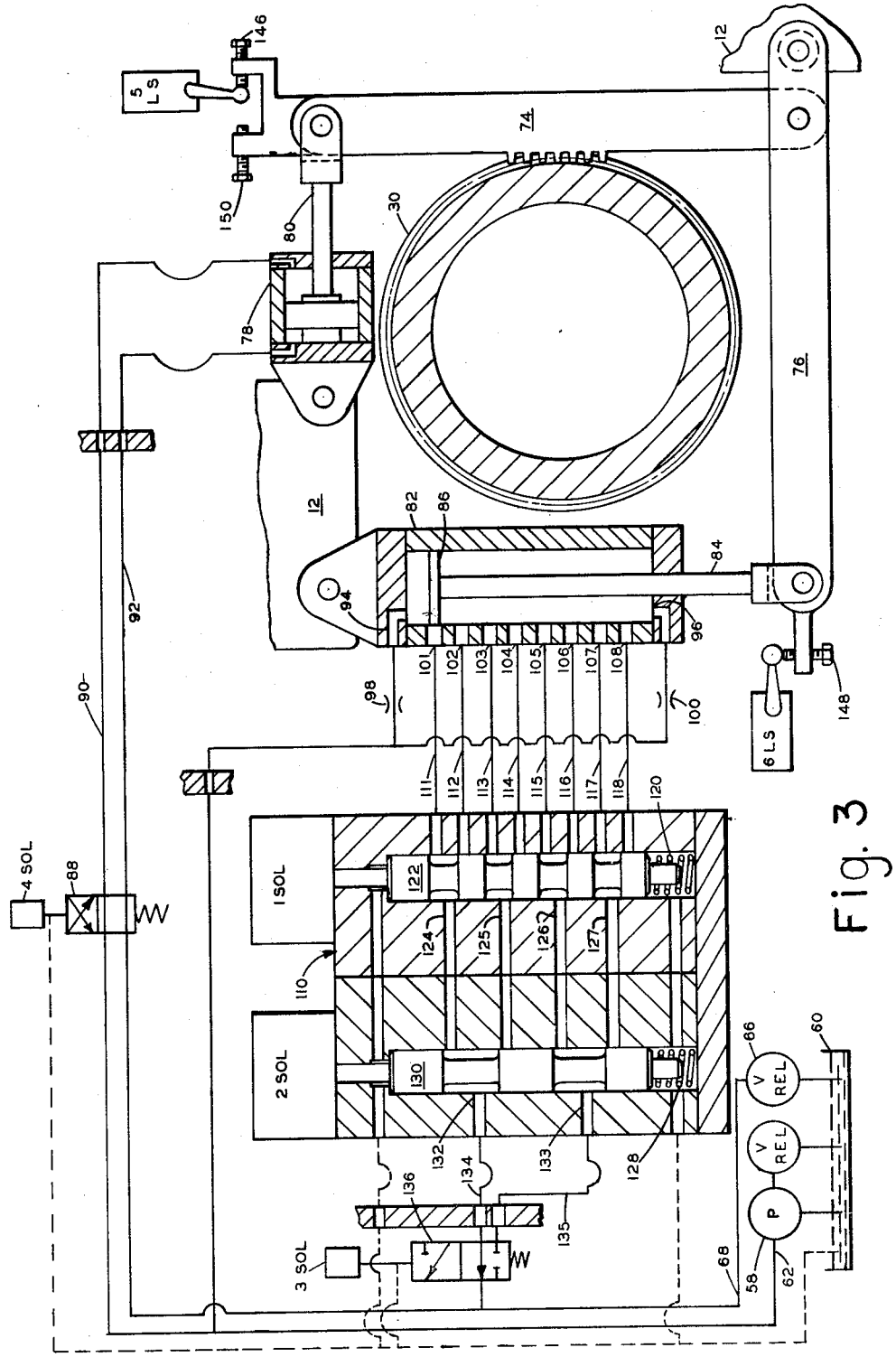
FIG. 3 is a schematic showing of the fine positioning portion of the indexing mechanism.

The other mechanism for movement of the rotating unit is shown in FIGS. 1 and 3. The gear 30 is engaged by a rack 74 that is pivotally attached to a lever 76 which in turn is pivotally movable about its one end secured to the base 12. The rack 74 is held in engagement with the gear 30 by operation of a piston and cylinder motor 78 having a piston rod 80 pivotally attached to an end of the rack 74. The motor 78 may be reversely operated to swing the rack 74 relative to the lever 76 to disengage the rack 74 from the gear 30 thus freeing the rotating unit for movement by the coarse positioning mechanism described.

The teeth of the rack 74 provide the means by which the rotating unit is accurately aligned after the motor 44 stops operating. The motor 44, while it can be stopped very quickly by fluid under pressure connected thereto with no exhaust flow, may in some cases move the rotating unit to an angular position with less accuracy than is required. The motor 44 however operates to move the rotating unit through the gear 30 consistently to within less than a half tooth misalignment of the rack teeth and the teeth of the gear 30. The engagement of the rack 74 with the gear 30 by the operation of the motor 78 then will align the rotating unit at an accurate angular location. If the gear 30 is, for example, a ninety tooth gear, the coarse mechanism described can position the index plate 10 in angular locations in increments of four degrees. The stops 36, 38, 40, 42 in the drum 34 with the ninety tooth gear 30 would then conveniently be spaced around the drum at corresponding four degree intervals or intervals of multiples of four degrees.

When the rack 74 is engaged with the gear 30, the lever 76 can be swung about its pivotally fixed end to produce a limited amount of movement of the rotating unit. The lever 76 is swung by operation of a piston and cylinder motor 82 having a piston rod 84 pivotally connected to the end of the lever 76 opposite to the end thereof which is pivotally secured to the base 12. The piston 86 within the motor is shown in its zero or starting position and it shifts in operation to move the rack 74 to rotate the gear 30, and therefore the rotating unit, clockwise as viewed in FIGS. 2 and 3, away from the angular position in which the rotating unit is left when the coarse motor 44 stops operating. The rack 74 can be utilized to rotate the unit for a limited amount only and the worm 54, FIG. 2, will be carried axially on the spline 52 away from the position shown a corresponding limited amount.

The fluid operating circuit for the fine positioning system operates from the same source of pressure 58, pressure line 62 and return line 78 (all shown duplicated in FIG. 3 for clarity) as does the coarse positioning mechanism. A single solenoid, two position, spring returned valve 88 controls the operation of the motor 78. With its solenoid 4SOL deenergized, the valve 88 connects the pressure and return lines 62 and 68 to the operating lines 90 and 92, respectively which holds the motor 78 in the condition shown. When the solenoid 4SOL is energized, the connections to the lines 90 and 92 are reversed to cause the motor 78 to shift the rod 80 rightward, as viewed in FIG. 3, to disengage the rack 74 from the gear 30. The rack 74 has two screws 146 and 150 which are adjusted to engage a limit switch 5LS, not spring biased, to produce signals indicating engagement and disengagement of the rack 74 with the gear 30 in response to operation of the motor 78.

The motor 82 which swings the lever 76 to produce fine positioning of the rotating unit is operated in accordance with a binary code system. In the example described, having four degree incremental coarse positioning available resulting from the use of a gear 30 with ninety teeth and fine positioning to each half degree, the motor 82 is operated to produce incremental angular shifts of the rotating unit from each four degree location of from zero degree to three and a half degrees in half degree steps. Thus the motor 82 is operated to shift the piston 86 therein to any selected one of eight positions in the motor 82, each of these positions being so located as to swing the lever 76 to a corresponding position to axially position the rack 74 either for movement of the rotating unit a selected increment away from the four degree locations or for exactly positioning the rotating unit at a four degree location.

The motor 82 has one of a pair of pressure ports 94, 96 at each end and each of the ports 94, 96 is connected to the pressure line 62 through one of the restrictions 98, 100. A series of ports 101 through 108 are spaced along the length of the motor 82. Each of these is slightly wider in the axial direction than the piston 86 such that when the piston 86 is centered over any one, the port will extend slightly on each side of the piston 86. When any one of the ports 101 through 108 is connected to the return line 68, the action of the restricted pressure connections at each end of the motor 82 will be to cause the piston 86 to move to and center over the port which is open to the return line 68 at which time the pressure on both sides of the piston 86 will be equal. Each of the ports 101 through 108 communicates with half of a double valve 110 through a set of fluid lines 111 through 118, respectively. Each of the lines 111 through 118 communicates with a bore 120 in the body of the double valve 110 in which a plunger 122 having four reduced diameter sections or cannelures for allowing fluid to pass is slidably received. A solenoid 1SOL is connected to the plunger 122 to shift it away from the end of the bore 120 at which it is shown to the other end thereof when that solenoid is energized. The cannelures of the plunger 122 communicate with a set of fluid passages 124 through 127 which terminate at their other end in a second bore 128 when the plunger 122 is at either end of the bore 120. A plunger 130 is slidably received in the bore 128 and has two cannelures thereon. The plunger 130 can be shifted to the other end of the bore 128 from the position shown by energization of a solenoid 2SOL connected thereto. With the plunger 130 at either end of the bore 128, its two cannelures communicate with the fluid passages 132 and 133. The fluid lines 134, and 135 connect the passages 132 and 133, respectively to a two position, single solenoid, spring returned valve 136. A solenoid 3SOL is connected to the valve 136 and may be energized to shift that valve to connect the fluid line 135 to the return line 68 but when it is deenergized the fluid line 134 is connected, as shown, to the return line 68.

As shown in FIG. 3 with the solenoids 1SOL, 2SOL and 3SOL deenergized, a fluid path is complete from the port 101 through the valves 110 and 136 to the return line 68. Thus the piston 86 is maintained in the position shown. If the solenoid 1SOL is energized, the plunger 122 is shifted downward and a fluid path is completed from the port 102 to the return line 68. Similarly, if only the solenoid 2SOL is energized to shift the plunger 130 downward, a fluid path is completed from the port 103 to the return line 68 and if both of the solenoids 1SOL and 2SOL are energized, the completed fluid path is from the port 104 to the return line 68. The energization of the solenoid 3SOL alone will complete the fluid path from the port 105 to the return line 68. Now with the solenoid 3SOL energized and the same sequence of energization of the solenoids 1SOL and 2SOL, that is, first the solenoid 1SOL alone, next the solenoid 2SOL alone, and then finally both of the solenoids 1SOL and 2SOL together, the complete return path would extend from the ports 106, 107 and 108 in that order.

From the foregoing it is shown that any one of the ports 101 through 108 can be connected to the return line 68. It has also been pointed out that when any one of the ports 101 through 108 is connected to return pressure, the piston 86 will center over that port. In the example described, the ports 101 through 108 are so spaced that when the piston 86 is centered over one and then moved to the next, the lever 76 will swing sufficiently to shift the rack 74 to produce one half degree of rotation of the rotating unit. Each of these one half degrees can be termed a unit of fine positioning. Thus it can be pointed out that the piston 86 may be placed in any one of eight positions to produce from zero to seven units of fine movement corresponding to a range of zero to three and a half degrees of rotation of the rotating unit. Since each of the solenoids 1SOL, 2SOL, and 3SOL can be placed selectively in one or the other of two states, the operation of the circuit by three two state devices to produce from zero to eight conditions by combinations of zero, one, two, and four, as the fine positioning fluid circuit described does, can be termed as being operation in accordance with a binary digital code.

The operation of the solenoids 1SOL, 2SOL, and 3SOL in the described manner is controlled by the condition of each of a set of limit switches 1LS, 2LS, and 3LS, respectively, FIG. 1. The condition of these limit switches 1LS, 2LS, 3LS depends in turn on the position of the stops 36, 38, 40 in each set of stops spaced at the four degree intervals around the drum 34. The other stop 42 of each set is utilized to effect operation of the solenoid 5SOL in the coarse positioning circuit. Each of the stops 36, 38 and 40 may be extended from the drum 34 to a position in which they will operate one of the set of limit switches 1LS, 2LS, 3LS to produce a composite fine position signal. The stops 36, 38, 40 can also be retracted to an inoperative position in which their respective limit switches will not be operated. Thus the stops 36, 38, and 40 also can be characterized as two state devices. The limit switches 1LS, 2LS, and 3LS have contacts the closing of which causes the energization of the solenoids through an electrical control circuit to be described.

In preparing a selected number of stop positions or angular locations for the index plate 10, the snap-in covers 138 and 140 may be removed to provide access to the stops 36, 38, 40, 42. The stop 42 is advanced in each four degree location which is at or immediately precedes the actual location in which it is desired to stop the plate 10. This will cause the limit switch 4LS to be operated and the coarse position motor 44 will be stopped and the fine position mechanism will be connected to the gear 30. If no other of the stops 36, 38, 40 is advanced in that location, the plate 10 will be accurately held on the four degree angular position by the fine positioning mechanism. However, if selected ones of the stops 36, 38, 40 are advanced, the fine positioning motor 82 will be operated to produce a selected number of additional half degree units of movement to a finely adjusted position corresponding to that defined by the advanced stops 36, 38, 40. These stops then in effect are information storage members which are set in a pattern according to the same binary digital code by which orderly operation of the solenoids 1SOL, 2SOL, 3SOL is achieved. The state of energization of the solenoids 1SOL, 2SOL and 3SOL then corresponds to the condition of operation of the limit switches 1LS, 2LS and 3LS, respectively, which in turn corresponds to the position of the stops 36, 38 and 40 after the plate 10 is stopped at a four degree incremental angular position by the selected advancement of one of the stops 42.

Figure 4:
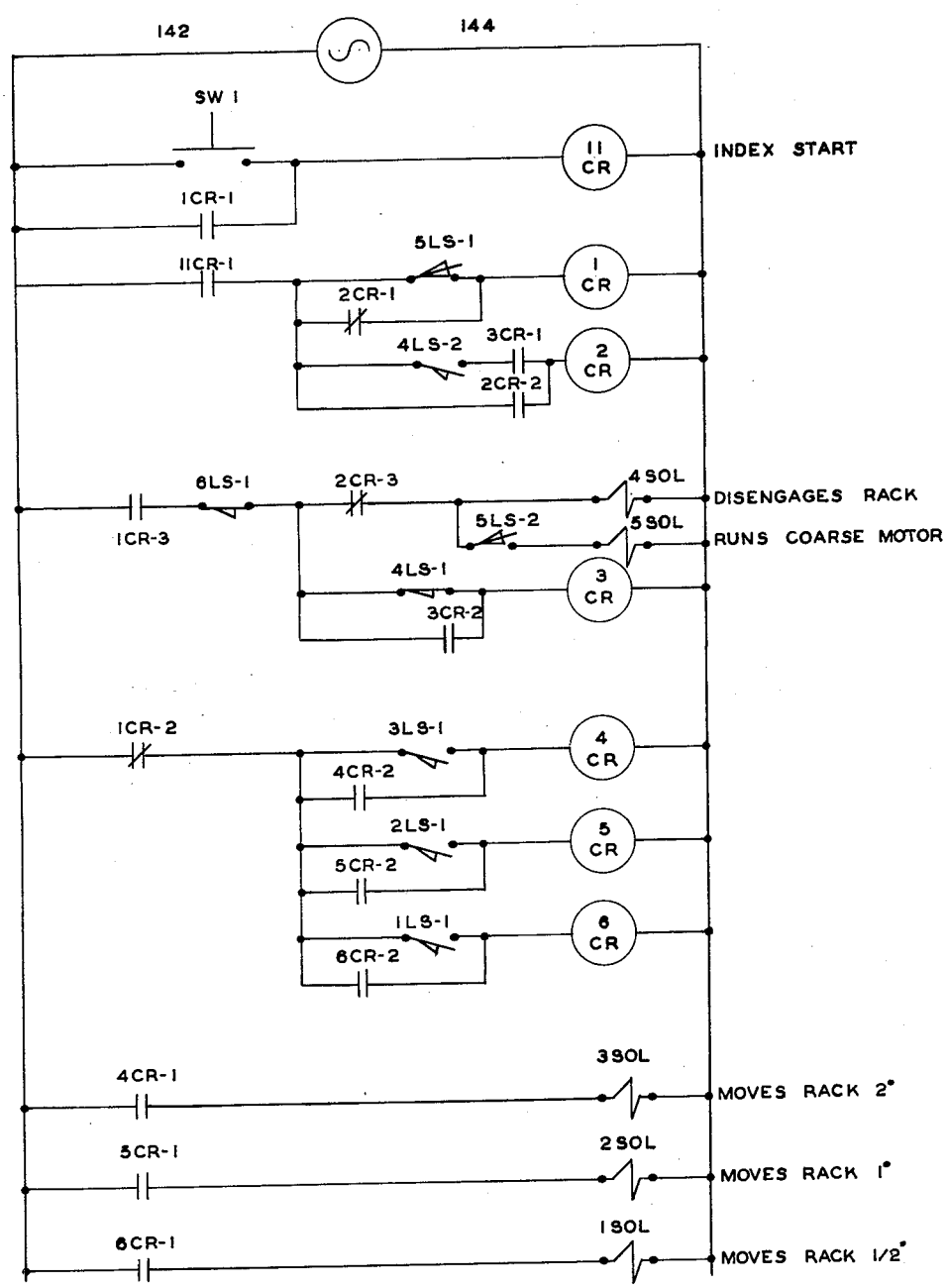
FIG. 4 is a schematic electrical diagram showing the control circuit for the indexing mechanism.

The electrical circuit which ties the operation of the limit switches 1LS, 2LS, 3LS, 4LS with the solenoids 1SOL, 2SOL, 3SOL and 5SOL as well as initiating an indexing movement is shown schematically in FIG. 4. To start an index cycle, the switch SW1 is momentarily closed. The relay 11CR is then connected across the power lines 142, 144 and is energized. The relay 1CR is next energized through the contacts 11CR-1 and the normally closed contacts 2CR-1, the limit switch contacts 5LS-1 being opened by the rack 74 in its engaged position by engagement of the limit swich 5LS by a dog 146 on the rack 74. When the relay 1CR is energized, the relay 11CR is latched energized through the contacts 1CR-1. At this same time, the normally closed contacts 1CR-2 are opened and the relays 4CR, 5CR and 6CR are deenergized to open their contacts 4CR-1, 5CR-1 and 6CR-1 causing the solenoid 3SOL, 2SOL and 1SOL, respectively, to be deenergized. The valves 110 and 136 are set to connect the port 101 to the return line 68 and the piston 86 moves to its zero position.

When the relay 1CR is initially energized, it also closes its contacts 1CR-3 to condition the solenoid 4SOL to energize and upon movement of the piston 86 to its zero position, a dog 148 on the lever 76 operates a limit switch 6LS having the contacts 6LS-1 which are closed to complete an energizing circuit for the solenoid 4SOL through the contacts 2CR-3, 1CR-3 and 6LS-1. The valve 88 shifts to connect the pressure line 62 to the line 92 and the return line 68 to the line 90. The motor 78 pushes the rack 74 out of engagement with the gear 30. When the rack 74 is in its disengaged position, a dog 150 engages the limit switch 5LS to close its contacts 5LS-2 and this in turn causes the solenoid 5SOL to energize and the valve 64 to shift for connection of the pressure line 62 to the line 70 and the return line 68 to the line 72. The motor 44 operates to rotate the worm wheel 32 clockwise as viewed in FIG. 2. When the rotating unit has swung to the next selected angular coarse position which is a multiple of four degrees, the dog 42 will operate the limit switch 4LS and the contacts 4LS-1 close to energize the relay 3CR. With the relay 3CR energized, its contacts 3CR-1 are closed in series with the contacts 4LS-2, which are closed simultaneously with the contacts 4LS-1, and the relay 2CR is energized. The contacts 2CR-3 are then opened resulting in the solenoids 4SOL and 5SOL being deenergized. This shifts the valve 64 back to the condition shown and the motor 44 is stopped as described while the valve 88 is shifted to cause the rack 74 to be reengaged with the gear 30. Engagement of the rack 74 with the gear 30 while the motor 82 is as shown, which is its condition at this point in the index cycle, causes the rotating unit to be accurately aligned on a position which is a multiple of four degrees.

When the rack 74 is reengaged, the limit switch 5LS is again operated by the dog 146 and the contacts 5LS-1 open to deenergize the relay 1CR. At the time the relay 1CR is deenergized, the latch contacts 1CR-1 open and the relay 11CR is deenergized and then the relay 2CR is deenergized by the opening of the contacts 11CR-1. The relay contacts 1CR-2 are closed at this same time and the relays 4CR, 5CR and 6CR are energizable and may latch through their respective contacts 4CR-2, 5CR-2 and 6CR-2. Which of these relays 4CR, 5CR, 6CR is energized is a function of the selected advancement of the stops 36, 38, and 40 adjacent to the stop 42, and in the same set therewith, which was set to stop the motor 44. Any combination of the dogs 36, 38, 40 may be advanced to engage the limit switches 1LS, 2LS, 3LS depending on the number of additional units of fine positioning movement that are desired to be added after the coarse movement. If none of the dogs 36, 38, 40 is advanced, the rotating unit will remain on a position which is a multiple of four degrees. Fluid under pressure will continue to be connected to the one of the ports 101 through 108 which is selected by the setting of the dogs 36, 38, 40 until the next index cycle is called for by the closing of the switch SW1. It is pointed out that the switch SW1 is shown for the purpose of illustration and might be any source effective to momentarily connect power across the relay 11CR.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. In combination with a rotatable member, an angular indexing mechanism comprising,
    (a) a coarse position motor connected to the member and selectively operable for rotation thereof,
    (b) means to produce a coarse position signal when the member is rotated to a selected predetermined angular position by said coarse position motor,
    (c) means responsive to said coarse position signal to deenergize said coarse position motor and stop rotation of the member thereby,
    (d) means to produce selected fine position signals when the member is in said predetermined angular position,
    (e) a fine position motor,
    (f) means to connect said fine position motor to the member in response to said coarse position signal, and
    (g) means to operate said fine position motor for rotation of the member from said predetermined angular position a preselected amount corresponding to said fine position signals, said fine position motor effective to hold the member in said predetermined angular position when no fine position signals are produced therein.

2. In combination with a rotatable member, an angular indexing mechanism comprising,
    (a) a coarse position motor connected to the member and selectively operable for rotation thereof,
    (b) means to produce a coarse position signal when the member is rotated to a selected predetermined angular position by said coarse position motor,
    (c) means responsive to said coarse position signal to deenergize said coarse position motor to stop rotation of the member thereby,
    (d) means to produce selected fine position signals when the member is in said predetermined angular position,
    (e) a fine position motor,
    (f) means to connect said fine position motor to the member in response to said coarse position signal, and
    (g) a control circuit having a plurality of elements, each of which is conditionable from one to the other of two states in response to one of said fine position signals, to effect operation of said fine position motor a preselected amount corresponding to said fine position signals.

3. In combination with a rotatable member, an angular indexing mechanism comprising,
    (a) a coarse position motor connected to the member and selectively operable for rotation thereof,
    (b) means to produce a coarse position signal when the member is rotated to a predetermined angular position by said coarse position motor,
    (c) means responsive to said coarse position signal to deenergize said coarse position motor to stop rotation of the member thereby,
    (d) means to produce selected fine position signals when the member is in said predetermined angular position, said fine position signals related in accordance with a binary code to represent a numerical output,
    (e) a fine position motor,
    (f) means to connect said fine position motor to the member in response to said coarse position signal, and
    (g) means responsive to said fine position signals to operate said fine position motor for rotation of the member from said predetermined angular position an angular distance corresponding to said numerical output.

4. In combination with a rotatable member, an angular indexing mechanism comprising,
    (a) a coarse position motor connected to the member for rotation thereof when operated,
    (b) means to produce a coarse position signal when the member is rotated to any one of a series of predetermined angular positions by said coarse position motor.
    (c) means to stop operation of said coarse position motor in response to said coarse position signal,
    (d) means to produce selected fine position signals when the member is in each of said predetermined angular positions, said fine position signals related in accordance with a binary code to represent a numerical output at each of said predetermined angular positions,
    (e) a fine position motor,
    (f) means to connect said fine position motor to the member in response to said coarse position signal,
    (g) means responsive to said fine position signals to operate said fine position motor for rotation of the member from each of the predetermined angular positions an angular distance corresponding to said numerical output at the respective predetermined angular position, and
    (h) means to initiate operation of said coarse position motor to effect rotation of the member in one direction whereby the member can be rotated by successive angular steps, the size of said angular steps dependent upon the occurrence of said coarse and fine position signals.

5. In combination with a rotatable member, an indexing mechanism comprising,
    (a) a coarse position motor connected to the member for rotation thereof when operated,
    (b) a cylindrical drum connected to the member for rotation therewith,
    (c) a coarse signal mechanism fixed adjacent said drum,
    (d) a plurality of coarse position stops received at equally spaced intervals around the periphery of said drum, said coarse position stops selectively extendable from said drum to engage said coarse signal means to produce a coarse position signal when the member is rotated by said coarse position motor to any one of a series of predetermined angular positions corresponding to the angular locations of extended coarse position stops,
    (e) means to stop operation of said coarse position motor in response to said coarse position signal,
    (f) a fine position motor,
    (g) means to connect said fine position motor to the member in response to said coarse position signal,
    (h) a plurality of fine position signal mechanisms fixed adjacent said drum,
    (i) a plurality of sets of fine position stops received around the periphery of said drum with the same angular interval therebetween as between said coarse position stops, each of said sets having a plurality of stops extendable to engage selected ones of said fine control mechanisms when a corresponding coarse position signal occurs, said fine position stops thereby producing fine position signals, said fine position signals related in accordance with a binary code to represent a numerical output,
    (j) means responsive to said fine position signals to operate said fine position motor for rotation of the member from each of the predetermined angular positions an angular distance corresponding to said numerical output at the respective predetermined angular position, and (k) means to initiate operation of said coarse position motor to effect rotation of the member in one direction whereby the member can be rotated by successive angular steps, the size of said angular steps dependent upon said coarse and fine position signals.

6. In combination with a rotatable member, an angular indexing mechanism comprising,
(a) a coarse position motor mechanically connected to the member and selectively operable for rotation thereof,
(b) means to produce a coarse position signal when the member is rotated to a predetermined angular position by said coarse position motor,
(c) means responsive to said coarse position signal to stop operation of said coarse position motor to stop rotation of the member thereby,
(d) means to produce selected fine position signals when the member is in said predetermined angular position, said fine position signals related in accordance with a binary code to represent a numerical output,
(e) a gear rotatable with the member,
(f) a rack supported adjacent said gear for lateral and axial movement,
(g) means to shift said rack laterally for engagement with said gear in response to said coarse position signal, and
(h) means responsive to said fine position signals after said rack engages said gear to shift said rack axially through a distance corresponding to said numerical output for an additional increment of rotation of the member from said predetermined angular position.

7. In combination with a rotatable member, an angular indexing mechanism comprising,
(a) a coarse position motor mechanically connected to the member and selectively operable for rotation thereof,
(b) means to produce a coarse position signal when the member is rotated to a predetermined angular position by said coarse position motor.
(c) means responsive to said coarse position signal to stop operation of said coarse position motor to stop rotation of the member thereby,
(d) means to produce selected fine position signals when the member is in said predetermined angular position, said fine position signals related in accordance with a binary code to represent a numerical output,
(e) a gear rotatable with the member,
(f) a lever pivotal about one end,
(g) a rack adjacent said gear and having one end pivotally connected to said lever at a location spaced from the end about which said lever pivots,
(h) means to pivot said rack relative to said lever in responsive to said coarse position signal to shift said rack into engagement with said gear, and
(i) means responsive to said fine position signals after said rack engages said gear to swing said lever through a distance corresponding to said numerical output whereby said rack is moved in its axial direction to rotate the member an additional distance from said predetermined angular position.

8. In combination with a rotatable member, an angular indexing mechanism comprising,
(a) a coarse position motor mechanically connected to the member and selectively operable for rotation thereof,
(b) means to produce a coarse position signal when the member is rotated to a predetermined angular position by said coarse position motor,
(c) means responsive to said coarse position signal to stop operation of said coarse position motor to stop rotation of the member thereby,
(d) means to produce selected fine position signals when the member is in said predetermined angular position, said fine position signals related in accordance with a binary code to represent a numerical output,
(e) a gear fixed on the member,
(f) a lever pivotal about one end,
(g) a rack adjacent said gear and having one end pivotally connected to said lever at a location spaced from the end about which said lever pivots,
(h) a piston connected to the other end of said lever to swing the lever about said one end when moved axially,
(i) a cylinder adapted to slidably receive said piston, said cylinder having a fluid pressure line in communication with each end thereof and a series of ports spaced therealong corresponding to the values of said numerical output, each of said ports extending on either side of said piston when said piston is centered thereover,
(j) a low pressure fluid return line, and
(k) means to connect said return line to said ports, one at a time in accordance with said numerical output whereby said piston is caused to center thereover and swing said lever to move said rack axially for rotation of the member an additional amount from said predetermined angular position.

9. In combination with a rotatable member, an angular indexing mechanism comprising,
(a) a coarse position motor mechanically connected to the member and selectively operable for rotation thereof,
(b) means to produce a coarse position signal when the member is rotated to a predetermined angular position by said coarse position motor,
(c) means responsive to said coarse position signal to stop operation of said coarse position motor to stop rotation of the member thereby,
(d) means to produce selected fine position signals when the member is in said predetermined angular position, said fine position signals related in accordance with a binary code to represent a numerical output,
(e) a gear fixed on the member,
(f) a lever pivotal about one end,
(g) a rack adjacent said gear and having one end pivotally connected to said lever at a location spaced from the end about which said lever pivots,
(h) a piston connected to the other end of said lever to swing the lever about said one end when moved axially,
(i) a cylinder adapted to slidably receive said piston, said cylinder having a fluid pressure supply line in communication with each end thereof and a series of ports spaced therealong corresponding to the values of said numerical output, each of said ports extending on either side of said piston when said piston is centered thereover,
(j) a low pressure fluid return line, and
(k) a fluid control circuit having a plurality of elements, each of which is positionable from one to the other of two conditions in response to one of said fine position signals whereby said circuit is operable in response to said fine position signals to connect said return line to said ports one at a time in accordance with said numerical output to effect a shift of said piston for centering thereover and to produce a swing of said lever to move said rack axially for rotation of the member an additional amount from said predetermined angular position.

10. In combination with a rotatable member, an angular indexing mechanism comprising,
(a) a coarse position motor connected to the member for rotation thereof when operated,
(b) a fine position motor, (c) means to produce sets of signals at a series of predetermined angular positions of the member, each of said sets including a coarse position signal and selected ones of said sets including a composite fine position signal, (d) means responsive to each coarse position signal to deenergize said coarse position motor to stop rotation of the member thereby, (e) means to connect said fine position motor to the member in response to each coarse position signal, (f) means to operate said fine position motor in response to said composite fine position signals to rotate the member a corresponding preselected amount away from the respective predetermined angular positions at which each of said position signals occurs, said fine position motor holding said member in the predetermined angular positions wherein no fine composite position signal occurs, and (g) means selectively energizable to effect disconnection of said fine position motor from the member and operation of said coarse position motor to effect angular indexing movement of the member.

11. In combination with a rotatable member, an angular indexing mechanism comprising, (a) a coarse position motor connected to the member for rotation thereof when operated, (b) a fine position motor, (c) means to produce sets of signals at a series of predetermined angular positions of the member, each of said sets including a coarse position signal and selected ones of said sets including a pattern of fine position signals, (d) means responsive to each coarse position signal to deenergize said coarse position motor to stop rotation of the member thereby, (e) means to connect said fine position motor to the member in response to each coarse position signal, (f) a control circuit having a plurality of elements, each of which is conditionable from one to the other of two states in response to one of said fine position signals to effect operation of said fine position motor a preselected amount corresponding to the pattern of said fine position signals to rotate the member away from the respective predetermined angular positions at which each of said patterns of fine position signals occur, said fine position motor holding said member in the predetermined angular positions wherein no fine position signals occur, and (g) means selectively energizable to effect disconnection of said fine position motor from the member and operation of said coarse position motor to effect angular indexing movement of the member.

12. The combination with a rotatable member, an angular indexing mechanism comprising, (a) a coarse position motor connected to the member and selectively operable for rotation thereof, (b) a fine position motor, (c) a set of trip operated signal devices, (d) a plurality of sets of stops carried by the member and spaced therearound, each of said stops in the sets selectively extendable to operate a predetermined one of said signal devices when the member is in a predetermined angular position whereby one stop of each set produces a coarse position signal and the other stops of each set produce selected patterns of operation of the other of said signal devices to define a composite fine position signal, (e) means responsive to each coarse position signal to deenergize said coarse position motor to stop rotation of the member thereby, (f) means operated in response to each coarse position signal to connect said fine position motor to the member, (g) a control circuit having a plurality of elements, each of which is conditionable from one to the other of two states in a pattern corresponding to each composite fine position signal to rotate the member away from the respective predetermined angular positions at which each fine position signal occurs after connection of said fine position motor to the member, and (h) means selectively energizable to effect disconnection of said fine position motor from the member and operation of said coarse position motor thereafter to effect angular indexing movement of the member.

No references cited.